United States Patent
Sundeep et al.

(10) Patent No.: US 11,214,735 B2
(45) Date of Patent: Jan. 4, 2022

(54) SOIL CONDITIONER FOR REDUCING THE SODICITY AND DISPERSION TO IMPROVE THE WATER MOBILITY IN VARIOUS SOILS

(71) Applicant: CHT Germany GMBH, Tübingen (DE)

(72) Inventors: Bhatt Sundeep, Melbourne (AU); John Saad, Greenvale (AU); Ralf Brückmann, Tübingen (DE); Peter Will, Mössingen (DE)

(73) Assignee: CHT Germany GMBH, Tubingen (DE)

( * ) Notice: Subject to any disclaimer, the term of this patent is extended or adjusted under 35 U.S.C. 154(b) by 20 days.

(21) Appl. No.: 16/482,364

(22) PCT Filed: Feb. 6, 2018

(86) PCT No.: PCT/EP2018/052951
§ 371 (c)(1),
(2) Date: Jul. 31, 2019

(87) PCT Pub. No.: WO2018/149700
PCT Pub. Date: Aug. 23, 2018

(65) Prior Publication Data
US 2020/0002610 A1    Jan. 2, 2020

(30) Foreign Application Priority Data
Feb. 14, 2017   (EP) .................................... 17156108

(51) Int. Cl.
   *C09K 17/38*   (2006.01)
   *A01C 23/04*   (2006.01)
   *C08L 83/08*   (2006.01)

(52) U.S. Cl.
   CPC ............ *C09K 17/38* (2013.01); *A01C 23/042* (2013.01); *C08L 83/08* (2013.01); *C08L 2201/52* (2013.01); *C08L 2205/025* (2013.01)

(58) Field of Classification Search
   CPC ....... C09K 17/38; A01C 23/042; C08L 83/08; C08L 2201/52; C08L 2205/025; C08G 77/445; C08G 77/388; C08G 77/46
   USPC .................................................. 252/88.1, 79
   See application file for complete search history.

(56) References Cited

U.S. PATENT DOCUMENTS

| | | | |
|---|---|---|---|
| 10,323,161 B2 * | 6/2019 | Riddle | .................... C08L 83/08 |
| 2002/0068689 A1 | 6/2002 | Fender et al. | |
| 2004/0030024 A1 | 2/2004 | Rosen et al. | |
| 2004/0219371 A1 | 11/2004 | Will et al. | |
| 2011/0003936 A1 | 1/2011 | Chen et al. | |
| 2012/0168664 A1 | 7/2012 | Maurer et al. | |

FOREIGN PATENT DOCUMENTS

| | | |
|---|---|---|
| DE | 102012010012 A1 | 11/2012 |
| GB | 1180733 A | 2/1970 |
| RU | 2601217 C1 | 10/2016 |
| SU | 1771481 A3 | 10/1992 |

OTHER PUBLICATIONS

Xu Xin et al., "Synthesis and application of quaternary ammonium modified polyether polysiloxane", Textile Auxilliaries, 32 (6), Jun. 2015 (3 pages). (Year: 2015).*
International Search Report for International Application No. PCT/EP2018/052951 dated May 2, 2018.
Michel et al., Mobility of a Polyether Trisiloxane Surfactant in Soil: Soil/Water Distribution Coefficients and Leaching in a Soil Column; Water Air Soil Pollut; Published online:Jan. 30, 2016, 227:66.

* cited by examiner

*Primary Examiner* — Douglas J McGinty
(74) *Attorney, Agent, or Firm* — Nexsen Pruet, PLLC; Seth L. Hudson (57) ABSTRACT

The present invention relates to a soil conditioner based on organomodified siloxanes and uses thereof as well as methods for conditioning soil, particularly farmland, which reduce the sodicity and dispersion to improve the mobility of water through the soil.

15 Claims, 10 Drawing Sheets

Average VWC for; Control = 35% (upper curve), Gypsum = 27.5% (lower curve), HANSA ADD Aquasil = 31.5 @30cm (middle curve).

Fig. 4

Average VWC for; Control = 22.5%, Gypsum = 30.5%, HANSA ADD Aquasil = 40% @60cm.

Fig. 5

Average VWC for; Control = 30%, Gypsum = 26%, HANSA ADD Aquasil = 39.5% @80cm.

Fig. 6

Average EC for; Control = 1480, Gypsum = 550, HANSA ADD Aquasil = 700 @30cm.

Fig. 7

Average EC for; Control = 1050, Gypsum = 900, HANSA ADD Aquasil = 1425 @60cm.

(Relatively constant EC for Control and Gypsum, however decreasing amounts of EC found in treated area)

SOIL CONDITIONER FOR REDUCING THE SODICITY AND DISPERSION TO IMPROVE THE WATER MOBILITY IN VARIOUS SOILS

FIELD OF THE INVENTION

The present invention relates to a soil conditioner based on organomodified siloxanes and uses thereof as well as methods for conditioning soil, particularly farmland, which reduce the sodicity and dispersion to improve the mobility of water through the soil.

BACKGROUND OF THE INVENTION

A lot of conditioners, which claim to improve a number of soil physical properties, are commercially available today. All of them are promoted with improved plant growth in response to their soil conditioning effects.

Most common additives to improve soil structures are organic materials, like compost. The beneficial effects of organic matter in the improvement or maintenance of soil physical properties has long been known. In most cases large amounts of organic materials must be applied to change the structure of the soil. In the agricultural sector often this kind of soil conditioning is not economical.

Another group form synthetic polymers, like polyacrylates and polyacrylamides. These polymers have a very high molecular weight which can bind particles together and form stable aggregates. This results in improvements in soil structure. Under field conditions such polymers have not shown consistent improvements in soil physical condition. Additionally, there are concerns that polyacrylamide used in agriculture may contaminate food with acrylamide, which is a known neurotoxin.

Another group of soil conditioners are mineral conditioners like gypsum. They can be used to displace exchangeable sodium from the cation exchange sites of soils with high sodium content.

Sodicity is a term given to the amount of sodium held in a soil. Sodium is a cation (positive ion) that is held loosely on clay particles in soil. It is one of many types of cations that are bound to clay particles. Other types bound to clay particles include calcium, magnesium, potassium and hydrogen. The amount of sodium as a proportion of all cations in a soil is the most important measure of sodicity. When sodium makes up more than about 5% of all cations bound to clay particles, structural problems begin to occur, and the soil is considered to be sodic. Such soils swell and lose structural integrity when wet, resulting in poor aeration, and exacerbating waterlogging. They also become hard when dry, impeding root growth and seedling emergence through dry surface soil crusts.

These properties present significant limitations on the yield potential of crops. For example about 30% of Australia's arable soil area is sodic. Sodicity often occurs together with soil salinity, which is a measure of the concentration of the soluble salts contained in the soil. These salts are free to move in the soil water and can readily be taken up by plants. These salts, which move freely in the soil solution, are made up of cations and anions. At any time, many cations are bound loosely to the surfaces of clay particles and are not free to move in the soil solution.

Cations in solution will often swap with those bound to clay particles. Therefore, if saline water with a high proportion of sodium is applied to a soil, the proportion of sodium bound to the clay particles may increase due to swapping of sodium in solution on to the clay particles. Similarly, if a solution high in calcium cations is applied to a soil, the proportion of calcium bound to clay particles may increase. If a source of calcium cations such as gypsum is added to a sodic soil it may ameliorate the sodicity and reduce the associated adverse effects by displacing sodium from the clay. Disadvantages of this treatment are that high rates of application are required and infiltration of calcium ions into the soil is a slow process because of gypsum's low solubility. In certain situations the risk of water logging is increased over the period of consumption of new Calcium from Gypsum treatment.

As water remains a limited resource that must be managed for both immediate and long term needs, the application of water represents an important factor in raising productivity in agriculture and ensuring the likelihood of outputs. The majority of industries that deal with soil had a common problem in the inability to move water to areas that are required. There have been many attempts to address this issue through the use of organic material, gypsum and polyacrylamides, but these have proven to be very inefficient.

With these difficulties present, it was postulated that organomodified siloxanes are likely to offer superior wetting and increased water movement through the soil when applied to soil.

GB 1,180,733 describes a method for modifying the moisture-retentive properties of a soil formation, wherein a finely-divided solid inorganic or organic material which has been rendered hydrophobic by contact with an organosilicon material is disposed within the soil formation. The time-dependent loss of water content by evaporation of a sand sample was significantly decreased by the disclosed method.

DE 10 2012 010 012 A1 discloses a liquid formulation of microorganisms in polyether modified trisiloxane to be used as a pesticide. The application of the formulation to soil, particularly crops, is disclosed.

US 2004/0030024 A1 mentions that trisiloxane-based surfactants are excellent wetting agents. The use of such, however, is described as disadvantageous due to their expensiveness and supposed instability in water.

A. Michel et al. (A. Michel, C. Dietschweiler, M. Böni et al. Water Air Soil Pollut (2016) 227: 66. doi:10,1007/s11270-016-2755-9) explain how polyether modified trisiloxane surfactants are widely used as agricultural adjuvants because they increase the activity and the rainfastness of pesticides. It is argued that there is only a small risk of such organomodified siloxanes reaching groundwater and thereby posing a threat to the environment after application on agricultural fields.

BRIEF SUMMARY OF THE INVENTION

The soil-conditioners of the prior art have apparently managed to somewhat improve the retention of water in various soils but have failed to provide a way for reducing their sodicity or enhancing their drainage potential. It is thus the problem of the present invention to overcome the aforementioned shortcomings of the prior art. Particularly, it is the problem of the invention to provide means for conditioning soils, particularly farmland, capable of reducing their sodicity and improving their water permeability.

DESCRIPTION OF THE DRAWINGS

The present invention is illustrated and described herein with reference to the various drawings, in which like reference numbers denote like method steps and/or system components, respectively, and in which.

DESCRIPTION OF THE INVENTION

In a first aspect of the invention the problem is solved by a soil-conditioner comprising siloxane components selected from the group of siloxane components having either the general formula I or the general formula II, characterized in that the siloxane components comprise at least one polyether modified siloxane A and at least one cationic modified siloxane B. According to this aspect of the invention the general formula I is represented by $$\begin{array}{c} R_1 \\ | \\ R_1-Si-R_1 \\ | \\ O \\ | \\ \left[ R_1-Si-(CH_2)_z-O-(C_2H_4O)_x(C_3H_6O)_yR_3 \right]_m \\ | \\ O \\ [R_1-Si-R_2]_n \\ | \\ O \\ \left[ R_1-Si-(CH_2)_z-O \overset{OH}{\underset{}{\frown}} \overset{A^-}{\underset{N^+-R_4}{|}} \overset{(C_2H_4O)_x(C_3H_6O)_yR_3}{\underset{(C_2H_4O)_x(C_3H_6O)_yR_3}{|}} \right]_o \\ | \\ O \\ R_1-Si-R_1 \\ | \\ R_1 \end{array}$$

wherein
n is an integer from 0 to 200,
m is an integer from 0 to 50,
o is an integer from 0 to 25,
m+o is an integer from 1 to 75,
x is an integer from 1 to 12,
y is an integer from 0 to 25,
z is an integer from 2 to 6, $R_1$ denotes an aliphatic radical with 1 to 3 carbon atoms or a phenyl radical, $R_2$ denotes an aliphatic radical with 1 to 30 carbon atoms or a phenyl radical, $R_3$ denotes hydrogen or an alkyl radical with 1 to 4 carbon atoms, $R_4$ denotes an aliphatic radical with 10 to 18 carbon atoms and wherein $A^-$ is an organic or inorganic anion derived from a customary physiologically tolerable acid HA.

The general formula II is represented by $$R_1-\underset{E}{\overset{R_1}{\underset{|}{Si}}}-O-\left[\underset{R_1}{\overset{R_1}{\underset{|}{Si}}}-O\right]_m\left[\underset{R_2}{\overset{R_1}{\underset{|}{Si}}}-O\right]_n\left[\underset{R_3}{\overset{R_1}{\underset{|}{Si}}}-O\right]_k\underset{E}{\overset{R_1}{\underset{|}{Si}}}-R_1$$

wherein
m is an integer from 5 to 200,
n is an integer from 0 to 25,
k is an integer from 0 to 25, $R_1$ denotes an aliphatic radical with 1 to 3 carbon atoms or a phenyl radical, $R_2$ denotes an aliphatic radical with 9 to 30 carbon atoms and/or a polyether radical of the general formula $(CH_2)_3O-(C_2H_4O)_x-(C_3H_6O)_yQ$, wherein x and y are integers from 0 to 50 having the same or different values, and Q is hydrogen or an alkyl radical with 1 to 4 carbon atoms.

$R_3$ denotes an epoxy radical or a radical MZ,

E denotes a radical MZ, $R_3$ or $R_2$, wherein at least one radical MZ is present per molecule, wherein the epoxy radical is selected from the group comprising, particularly consisting of, $$-(CH_2)_3OCH_2-\!\!\!\triangle\!\!\!_O \quad -(CH_2)_2-\!\!\!\triangle\!\!\!_O$$

$$-(CH_2)_3-\!\!\!\triangle\!\!\!_O \quad -CH_2CH-\!\!\!\underset{CH_3}{\bigcirc}\!\!\!-\!\!\!\underset{CH_3}{\overset{O}{\bigcirc}}$$

$$-CH_2CH-\!\!\!\underset{CH_3}{\bigcirc}\!\!\!\underset{O}{\overset{CH_3}{\bigcirc}} \quad -(H_2C)_2-\!\!\!\bigcirc\!\!\!-\!\!\!O$$

$$\bigcirc\!\!\!\bigcirc\!\!\!-O \quad -(CH_2)_2OCH_2-\!\!\!\triangle\!\!\!_O$$

wherein M is selected from the group comprising, particularly consisting of, $$-(CH_2)_3CHCH_2- \quad -(CH_2)_3CHCH_2OH$$
$$\phantom{-(CH_2)_3}|\phantom{CHCH_2-} \phantom{-(CH_2)_3}|$$
$$\phantom{-(CH_2)_3}OH \phantom{CHCH_2-} \phantom{-(CH_2)_3}OH$$
$$-(CH_2)_3OCH_2CHCH_2- \quad -(CH_2)_3OCH_2CH-$$
$$\phantom{-(CH_2)_3OCH_2CH}|\phantom{CH_2-} \phantom{-(CH_2)_3OCH_2CH}|$$
$$\phantom{-(CH_2)_3OCH_2CH}OH \phantom{CH_2-} \phantom{-(CH_2)_3OCH_2}CH_2OH$$

-continued wherein Z is selected from the group comprising, particularly consisting of, wherein the quaternary nitrogen atom of the group Z is bound to a carbon atom of the group M that is adjacent to the C—OH group of the same group M, wherein $R_4$, $R_5$, $R_6$ can be the same or different and are selected from the group comprising, particularly consisting of, hydrogen, alkyl radicals with 1 to 22 carbon atoms, alkylene radicals with 1 to 22 carbon atoms, wherein the alkyl and alkylene radicals may comprise hydroxyl groups, wherein $R_8$ and $R_9$ can be the same or different and are selected from the group comprising, particularly consisting of, $R_4$, $R_5$, $R_6$, and alkyl radicals with 1 to 10 carbon atoms that are substituted by fluorine, chlorine or bromine, wherein $R_{10}$ denotes —O— or —$NR_{11}$—, wherein $R_{11}$ denotes hydrogen, an alkyl radical with 1 to 4 carbon atoms or a hydroxyalkyl radical with 1 to 4 carbon atoms, wherein o is an integer from 1 to 4, p is an integer from 2 to 6, and wherein $A^-$ is an organic or inorganic anion derived from a customary physiologically tolerable acid HA.

Siloxane A and Siloxane B can be the same or different. If siloxane A and siloxane B are the same, the polyether functional group and the cationic functional group are part of the same molecule.

Preferably, at least one of the siloxanes A and B does not contain epoxy radicals or corresponds to either formula I or formula II with k equals 0.

In an alternative embodiment, siloxane A and/or siloxane B contains one or more epoxy radicals.

A cationic modified siloxane comprising epoxy radicals with a general formula similar to formula H is known from EP 1 448 648 B1 as a textile adjunct, yet so far unknown as a soil-conditioner in combination with said polyether modified siloxane A.

Surprisingly, it was found that the soil-conditioner according to the first aspect of the invention is able to improve the soil structure and aeration as well as to increase its water holding capacity. Furthermore the cationic structure of the siloxane B provides for good soil reclamation and a release of locked nutrients, particularly in alkali soils.

Consequently better root development and higher yields and quality of crops are achievable. These properties are very useful for the management of problems in crops that are planted on sodic soils.

The polyether modified siloxane component A of the inventive soil-conditioner lowers the surface tension and acts as a wetting agent, while the cationic modified siloxane component B surprisingly effects an ion exchange, particularly of sodium ions present in sodic soils.

Among the most important properties of the polyether modified siloxane A component is its excellent wetting effect on almost every surface at very high levels of dilution (e.g. 0.1%). Depending on the particle size of the soil being treated, the superior wetting may increase the water retention or improve the drainage of the soil. In principle, higher drainage is associated with higher particle sizes and increased water retention with soils rich in clay. Furthermore said wetting agent surprisingly improves the transport of the cationic modified siloxane B into the soil.

The inventive soil-conditioner unexpectedly promotes the creation of new capillaries and activates existing capillaries in the soil for greater water movement, particularly in soils with small particle sizes such as clays. Thereby the availability of water beyond the irrigation point in the soil is improved, consequently increasing the water reserve capacity of the soil and encouraging the propagation of active roots of plants.

The subsequent finding is that due to the greater water movement through the soil, the water surprisingly is able to dissolve and expel a greater quantity of salts and organic matter. This behaviour is unexpectedly accelerated by the synergistic effects of the cationic modified siloxane B component of the inventive soil-conditioner that acts in an ion exchange mechanism with sodium and aluminum and increases the dissolution of these salts and their leaching through the permeate.

Potable water is most suitable as irrigation water, but today much recycled water and ground water laden in sodium salts is being used for irrigation purposes. The present invention surprisingly ameliorates the risks of using such saline water, and controls the deposition of sodium to the soil.

The following preferred embodiments of the invention are exemplary and not meant to limit the scope of the invention.

In a preferred embodiment of the invention the cationic modified siloxane B corresponds to formula II. In an alternative embodiment of the invention, the cationic modified siloxane B corresponds to formula I, wherein o is an integer from 1 to 25

In a preferred embodiment of the invention, when the cationic modified siloxane B corresponds to formula II, the fraction of alkyl radicals having 2 to 30 carbon atoms of the cationic modified siloxane component B of the inventive soil-conditioner is more than 10 mol % of the total number of radicals in said cationic modified siloxane B.

Preferably, when the cationic modified siloxane B corresponds to formula II, the group $R_2$ of said cationic modified siloxane B is an aliphatic radical with 10 to 20 carbon atoms.

In an alternative embodiment of the inventive soil-conditioner, when the cationic modified siloxane B corresponds to formula II, the polyether radical in group $R_2$ of said cationic modified siloxane B is a polyether radical of the general formula $(CH_2)O(C_2H_4O)_x(C_3H_6O)_yQ$, wherein x and y are the same or different and x is an integer from 8 to 15, y is an integer from 0 to 25 and Q is hydrogen or an alkyl radical with 1 to 4 carbon atoms.

Most preferably the cationic modified siloxane B has the formula

In a preferred embodiment, the polyether modified siloxane A corresponds to formula I, wherein m is an integer from 1 to 50. in an alternative embodiment, the polyether modified siloxane A corresponds to formula II, wherein n is an integer from 1 to 25.

When the polyether modified siloxane A corresponds to formula I, the groups $R_1$ and/or $R_3$ of the polyether modified siloxane A are preferably methyl radicals.

Most preferably the polyether modified siloxane A has the formula . . .

In an alternative embodiment of the invention, siloxane A and siloxane B have the same formula, preferably the formula In a preferred embodiment, the solid-conditioner further comprises a solvent, particularly water. The solid-conditioner may also comprise an emulsion of the polyether modified siloxane A and the cationic modified siloxane B in a solvent and an emulsifier, particularly water. Preferably, such an emulsion comprises 20 to 70 vol % of said siloxane components A and B, particularly 50 vol %. More preferably the soil-conditioner consists of an emulsion of the polyether modified siloxane A and the cationic modified siloxane B in a solvent, particularly water.

The aforementioned emulsions comprise an emulsifier. Any emulsifier suitable to create an emulsion of siloxanes in a solvent, particularly water, can be employed. The following list is exemplary and not meant to limit the scope of the invention.

Suitable non-ionic emulsifiers comprise alkyl polyglycol ethers, preferably those with 4 to 40 ethylene oxide units and/or alkyl radicals with 8 to 20 carbon atoms, alkylaryl polyglycol ethers, preferably those with 4 to 40 ethylene oxide units and/or with 8 to 20 carbon atoms in the alkyl radicals, ethylene oxide/propylene oxide block copolymers, preferably those with 4 to 40 ethylene oxide/propylene oxide units, saturated and unsaturated fatty acids with 6 to 24 carbon atoms, natural products and their derivatives such as lecithin, lanolin, saponins and cellulose, cellulose alkyl ethers and carboxyalkylcelluloses with alkyl groups with no more than 4 carbon atoms, linear polydiorganosiloxanes comprising polar groups, preferably polyether groups and saturated and unsaturated alkoxyllated fatty amines with 8 to 24 carbon atoms.

Suitable cationic emulsifiers comprise salts of primary, secondary and tertiary fatty amines with 8 to 24 carbon atoms, particulary salts with acetic acid, hydrochloric acid and phosphoric acid, quaternary alklybenzylammonium salts, particularly those with alkyl groups of 6 to 24 carbon atoms as halogenides, phosphates, sulfates and acetates, alkylpyridinium, alkylimidazolium and alkoxyazolinium salts, prereably those with alkyl chains of no more than 18 carbon atoms as halogenides, sulfates, phosphates and acetates.

Further suitable emulsifiers comprise fatty acid polyglycol ethers, polyethoxy fatty acid glycerides and sorbitan esters, alkyl polyglycosides, fatty acid alkoxy amides, alky ether carboxylic acids, alkaryl ether carboxylic acids, ethoxylated quaternary ammonium salts, amine oxides, betaines, sulfobetaines and sulfosuccinates.

In an alternative embodiment of the invention the soil-conditioner comprises from 0.5 to 1 vol % of said siloxane components A and B.

Preferably the molar ratio of the cationic modified siloxane component B to the polyether modified siloxane component A in the inventive soil-conditioner is less than 0.5, more preferably less than 0.125, most preferably less than 0.08.

In another aspect of the invention the problem is solved by a method for treatment of soil, particularly farmland. In the inventive method, a cationic modified siloxane is applied to the soil. Preferably, the aforementioned cationic modified siloxane B is applied to the soil. More preferably, said cationic modified siloxane B is applied to the soil in form of an emulsion. Most preferably, the soil is treated with an emulsion of said cationic modified siloxane B in water.

By treating the soil with a cationic modified siloxane, the sodicity of the soil is surprisingly reduced due to its ion exchange capabilities. This effect is particularly beneficial in the treatment of sodic soil that is to be used as farmland.

Preferably, the soil is treated with both the aforementioned cationic modified siloxane B and the aforementioned polyether modified siloxane A. Said siloxane components A and B can be applied to the soil simultaneously or successively.

The additional application of said polyether modified siloxane A surprisingly increases water mobility and improves the drainage of the soil. Furthermore the application of said polyether modified siloxane A surprisingly improves the transport of said cationic modified siloxane B into the soil.

It is possible to first treat the soil with said polyether modified siloxane A and subsequently treat the soil with said cationic modified siloxane B. Alternatively, it is also possible to first treat the soil with said cationic modified siloxane B and subsequently treat the soil with said polyether modified siloxane A.

In a preferred embodiment the soil is treated with the aforementioned soil-conditioner comprising said polyether modified siloxane A and said cationic modified siloxane B, preferably in combination with a solvent, particularly water, more preferably in form of an emulsion in a solvent, most preferably in form of an emulsion in water. Said emulsion further comprises an emulsifier.

Without limitation to the scope of the invention, the soil may be treated with a soil-conditioner having any of the aforementioned features of the soil-conditioner according to the first aspect of the invention.

Preferably the soil is treated with an amount of 20 to 180 kg per hectare, more preferably 50 to 160 kg per hectare, most preferably 100 to 150 kg per hectare, of the active siloxane components per 150 mm depth estimate or with an amount of 50 to 200 ppm in respect of the volume of soil to be treated.

In a further aspect of the invention the problem is solved by the use of a cationic modified siloxane, preferably the aforementioned cationic modified siloxane B, in the treatment of soil, particularly farmland. In an alternative embodiment the soil-conditioner according to the first aspect of the invention is used in the treatment of soil, particularly farmland. Preferably said cationic modified siloxane, particularly said cationic modified siloxane B, and/or said soil-conditioner is used in the treatment of sodic soil.

The sodic soil to be treated may be a sodic clay, defined as a clay containing more than 5% by weight of sodium. The treatment of soil, particularly farmland, with said cationic modified siloxane and/or said soil-conditioner is, however, not limited to sodic soils, particularly sodic clays, containing more than 5% by weight sodium. Any soil containing sodium may be treated according to the invention.

In a further aspect of the invention, a cationic modified siloxane, particularly said cationic modified siloxane B, and/or said soil-conditioner is used to generally decrease the sodium contents of soils, particularly clays, more particularly farmland. Said siloxanes and/or said soil-conditioner may be used to decrease the sodium content of a sodic soil, that is a soil containing more than 5% by weight of sodium. Said siloxanes and/or said soil-conditioner may also be used to decrease the sodium content of soils containing less than 5% by weight of sodium. A lower starting concentration leads to a. more effective improvement of soil structure.

The preferred embodiments of the invention described above are meant to be exemplary and are not meant to limit the scope of the invention.

EXAMPLE 1

The objective of the example was to determine whether pre-planting treatment of an area of sodic soil from Werribee South, Victoria, Australia with the inventive soil-conditioner is associated with changes in soil cation concentrations, salinity, pH and water permeability in a commercial broccoli crop, in comparison with areas of untreated and gypsum-amended soil. The roots of broccoli reach a depth of approximately 20 cm.

The trial was set up as three large plots, each plot comprising 5 bays across the full width of the field. The width of each bay was 12 m. Each bay was irrigated by fixed sprinklers located 9 m apart in rows at the edge of each bay.

The soil treatments were as follows:
Inventive soil-conditioner @16 g/m$^2$ (160 kg/ha) of active ingredient
Gypsum @2000 kg/ha
Untreated There was also a manure soil amendment treatment at the trial site, which was not monitored in this study. All treatments were applied before the crop was planted in early October 2016. The inventive soil-conditioner was applied in two stages, with the last application on 5th October. The fact that the rate of application of the inventive soil-conditioner is only one tenth of the rate of gypsum application in the trial is of considerable interest as well as the fact that the inventive soil-conditioner is delivered via the fertigation system rather than the mechanical spreader.

The inventive soil-conditioner consisted of an emulsion of 25 wt % of siloxane A and 25 wt % of siloxane B in water, corresponding to a molar ratio of siloxane A to siloxane B of 8 to 1. The inventive soil-conditioner was applied by the following protocol:

Phase 1—Application of Product After First Tillage (20 Sep. 2016)
1. To ensure that the product reaches its target zone, the topsoil must be wetted out. If no recent rain event, irrigate for 30 mins at 1200 L/hr per sprinkler.
2. The inventive soil-conditioner is then injected into the fertigation line —0.5 km pipe with a 6 inch main that will take about 15 minutes to get to trial site. Dosing rate of approximately 6 L/min (160 kg of the inventive soil conditioner) for 30 mins.
3. Followed by irrigating with water only for 30 mins.

Phase 2—Application of Second Lot of Product —160 kg (5 Oct. 2016)

Soil samples of 500 g each were taken using a soil corer from the top 5 to 20 cm at twenty locations within the middle 3 bays of each plot. The samples were taken along two diagonal transects per plot, and bagged and labeled for chemical analysis. The coordinates of each sample location were determined using GPS and recorded. The reason for omitting the top 5 cm was to avoid anomalies resulting from fertilizer granules that had been spread on the surface. A first lot of samples was taken on 7 Oct. 2016 (treatment and gypsum) and 12 Oct. 2016 (untreated). At the time of sampling the crop had been planted only recently and the seedlings were about 10 cm high. A second lot of samples was taken before harvest on 15 Dec. 2016.

Figure 1:
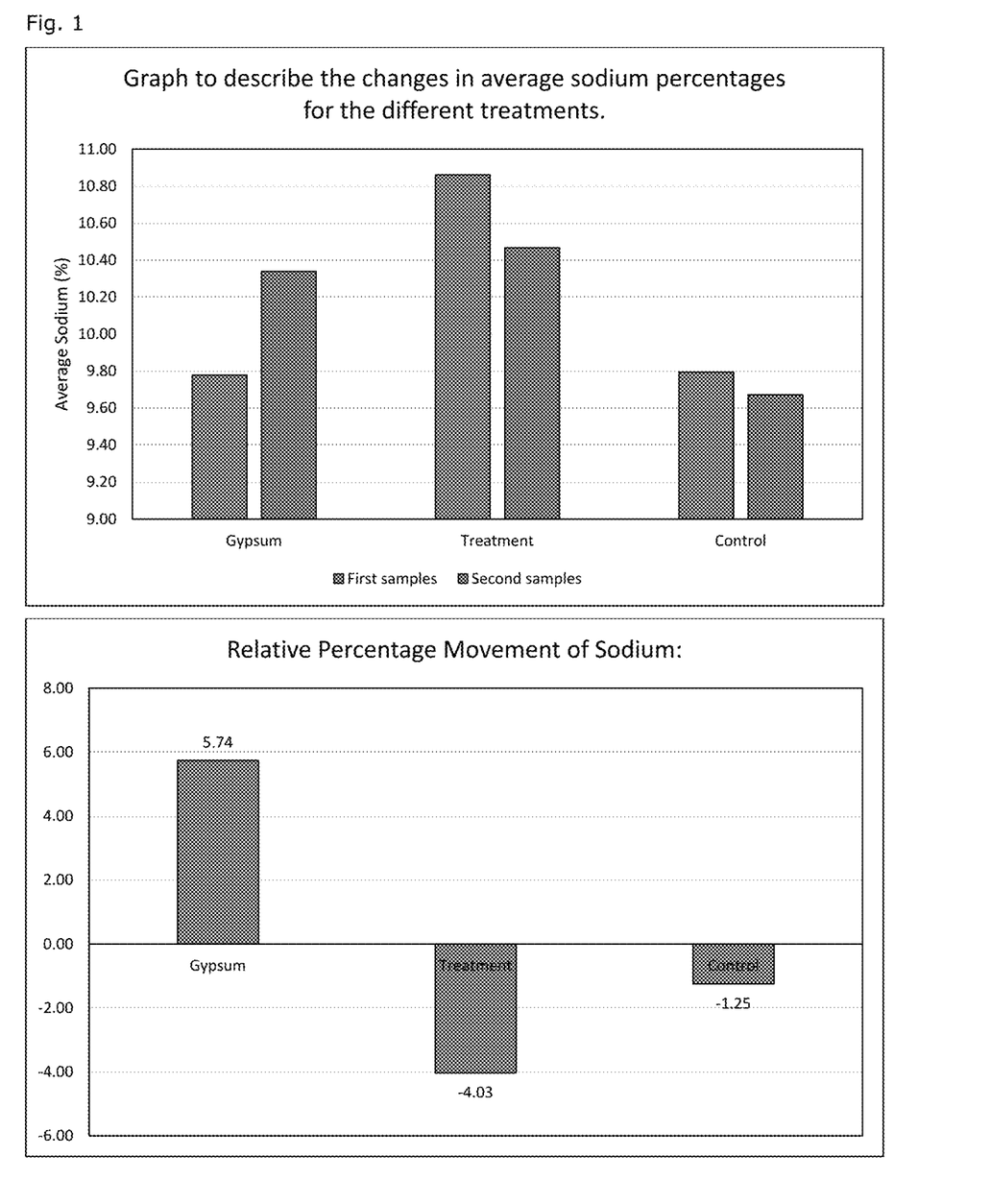
FIG. 1 is a graph showing the changes in average sodium percentages for treatments.
Figure 2:
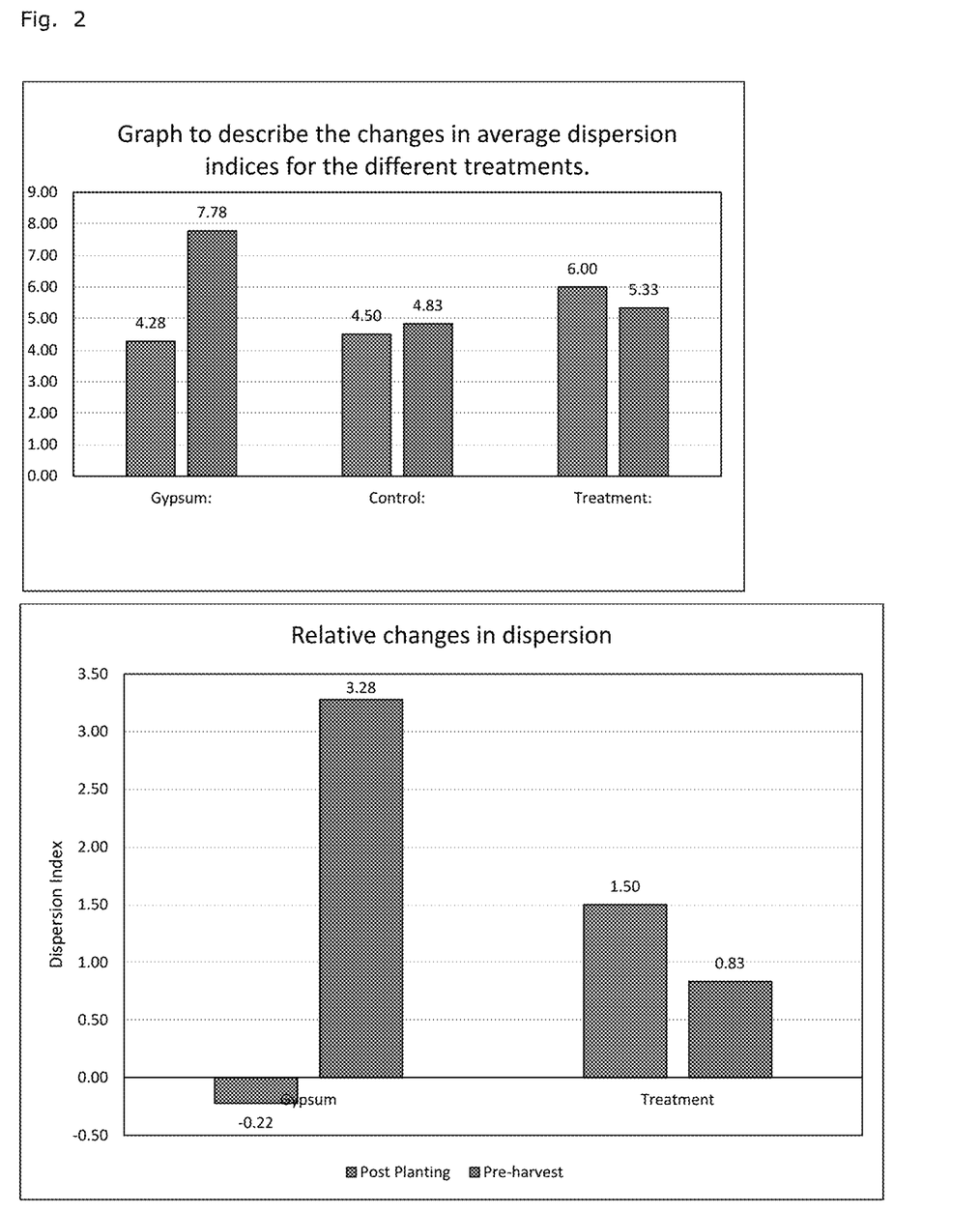
FIG. 2 is a graph showing the relative percentage movement of sodium.

The sodicity (FIG. 1) and dispersion (FIG. 2) of the samples were analyzed. The averaged results show an increase in sodium percentage of gypsum at 0.56% while the control and treated areas indicate a decrease at 0.12 and 0.39 respectively. This result indicates that the gypsum is helping to free up the sodium present in the soil but is unable to flush it through. On the other hand, the treatment with the inventive soil-conditioner has mobilized the sodium ions while creating capillaries to flush it out through the soil. The use of the inventive soil-conditioner is 3 times more effective than the control and 8 times more effective than Gypsum in flushing sodium out of the soil. In this environment Gypsum is an inefficient treatment and has a delay in improving the structure of the soil.

Soil parameters of water content and electrical conductivity at depths of 30, 60 and 80 cm were constantly monitored in each soil using Wildeye® data loggers equipped with Decagon GS3 sensors. The Wildeye®, system offers remote access to each data logger via the internet. Data are easily downloaded as MS Excel files and can also be viewed in graphical form on line. The collected data is shown below in FIGS. 3 to 10.

Figure 3:
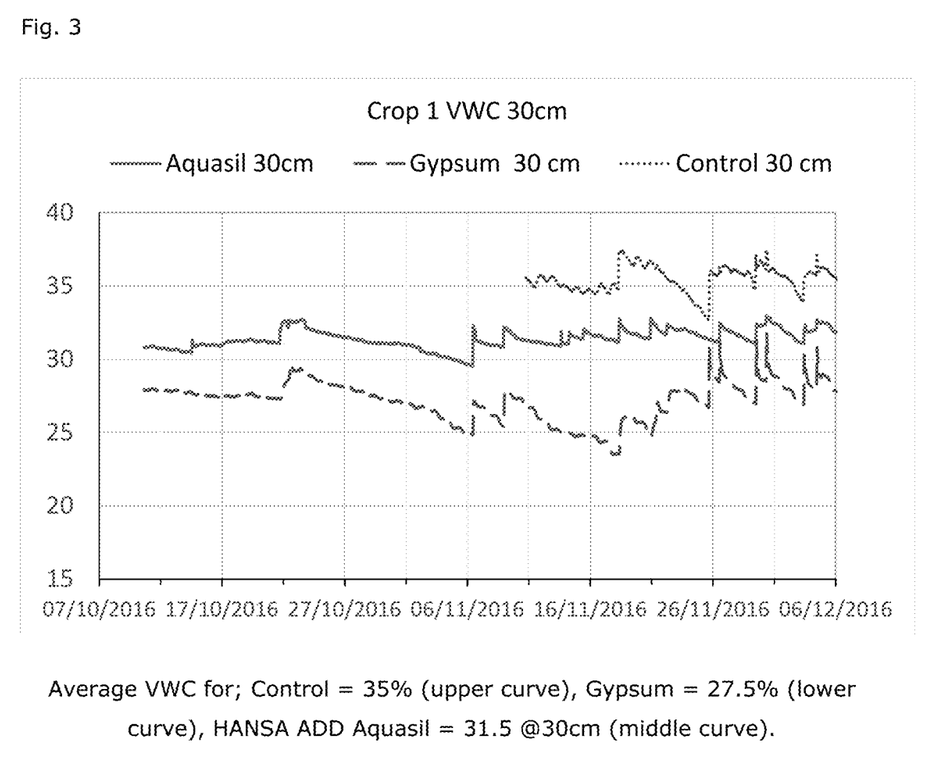
FIG. 3 shows a comparison of volumetric water content data for treated and untreated soil untreated soil at a depth of 30 cm.

FIG. 3 shows a comparison of volumetric water content (VWC) data for treated (gypsum and inventive soil-conditioner) and untreated soil at a depth of 30 cm.

Figure 4:
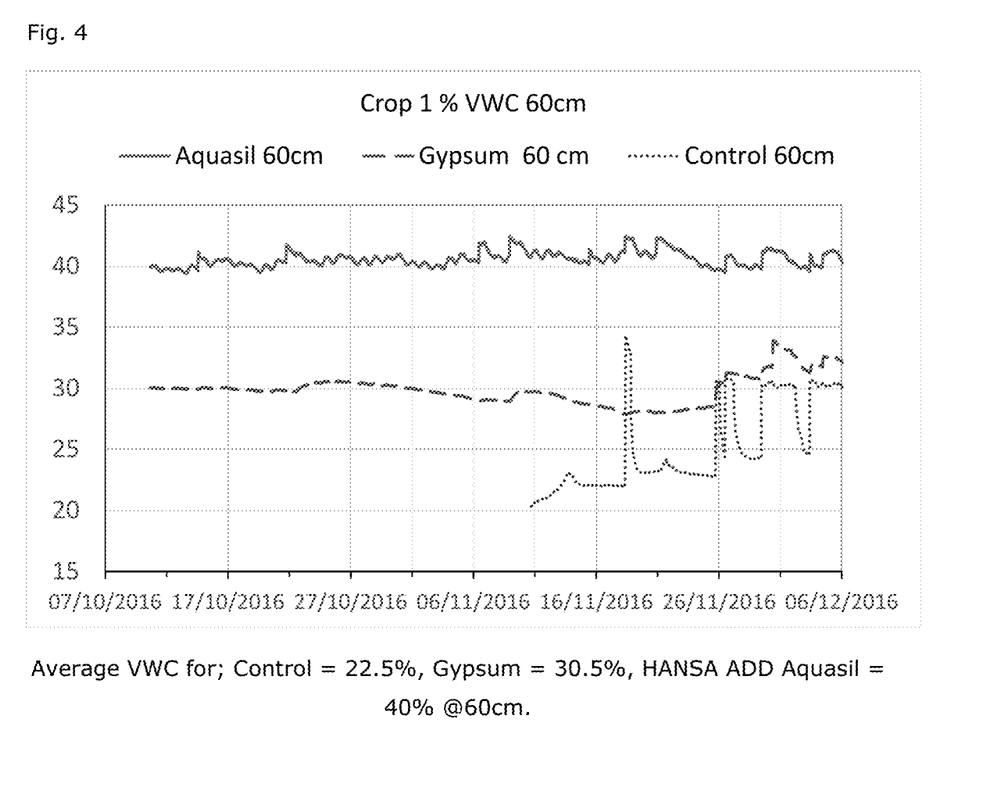
FIG. 4 shows a comparison of volumetric water content (VWC) data for treated (gypsum and inventive soil-conditioner) and untreated soil at a depth of 60 cm.

FIG. 4 shows a comparison of volumetric water content (VWC) data for treated (gypsum and inventive soil-conditioner) and untreated soil at a depth of 60 cm.

Figure 5:
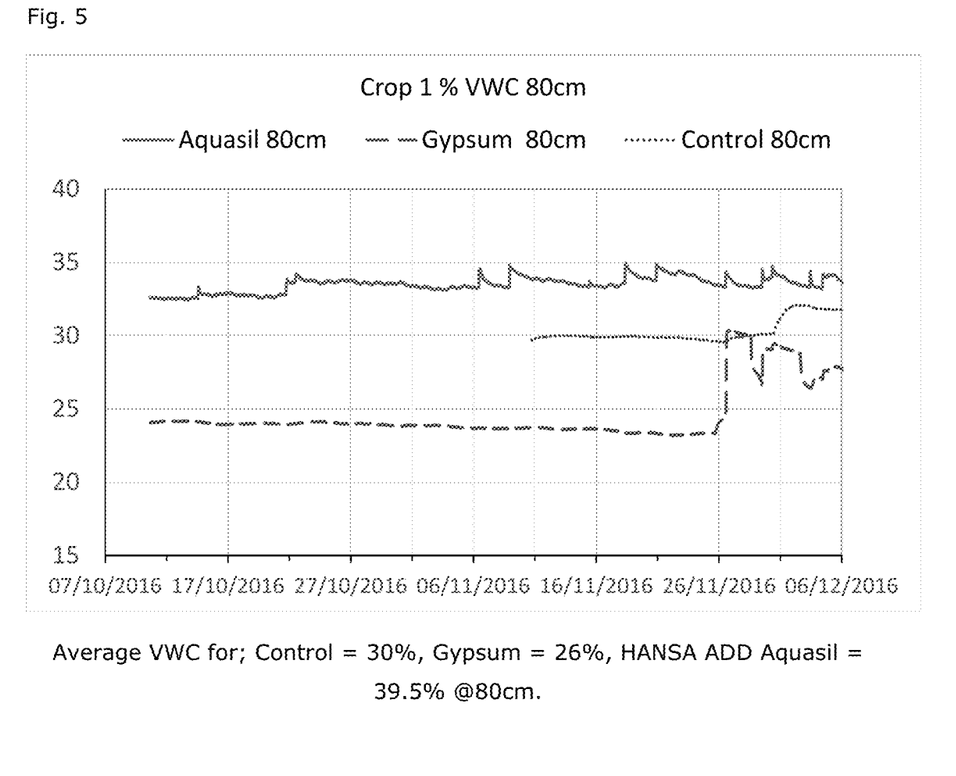
FIG. 5 shows a comparison of volumetric water content (VWC) data for treated (gypsum and inventive soil-conditioner) and untreated soil at a depth of 80 cm.

FIG. 5 shows a comparison of volumetric water content (VWC) data for treated (gypsum and inventive soil-conditioner) and untreated soil at a depth of 80 cm.

Figure 6:
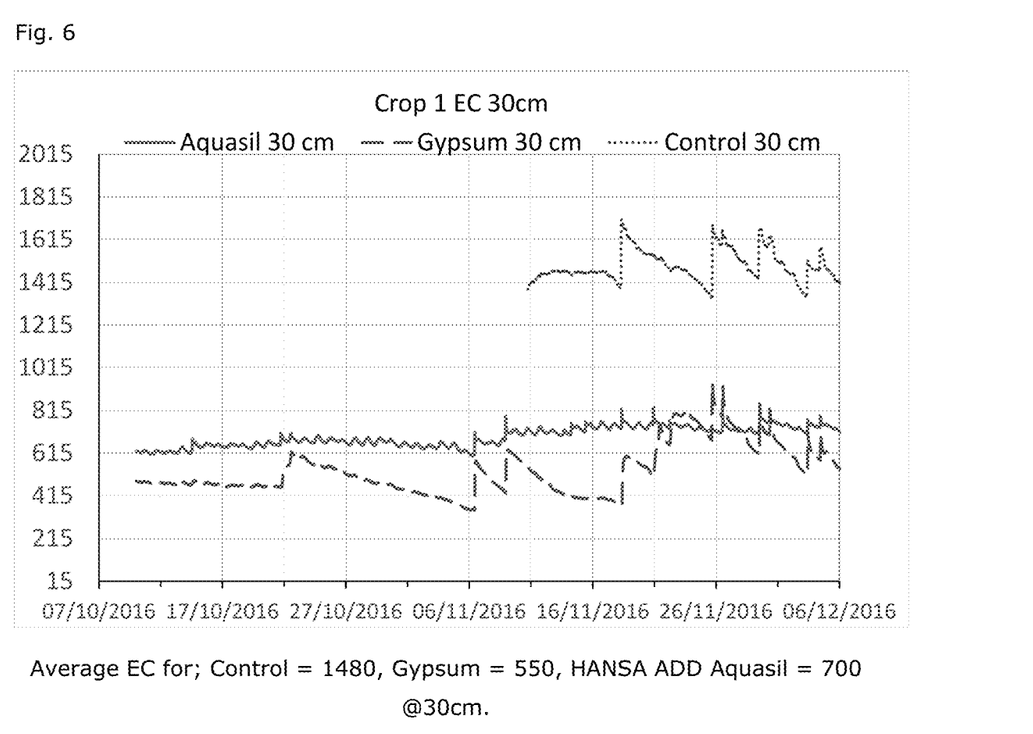
FIG. 6 shows a comparison of electrical conductivity (EC) of soil water data for treated (gypsum and inventive soil-conditioner) and untreated soil at a depth of 30 cm.

FIG. 6 shows a comparison of electrical conductivity (EC) of soil water data for treated (gypsum and inventive soil-conditioner) and untreated soil at a depth of 30 cm.

Figure 7:
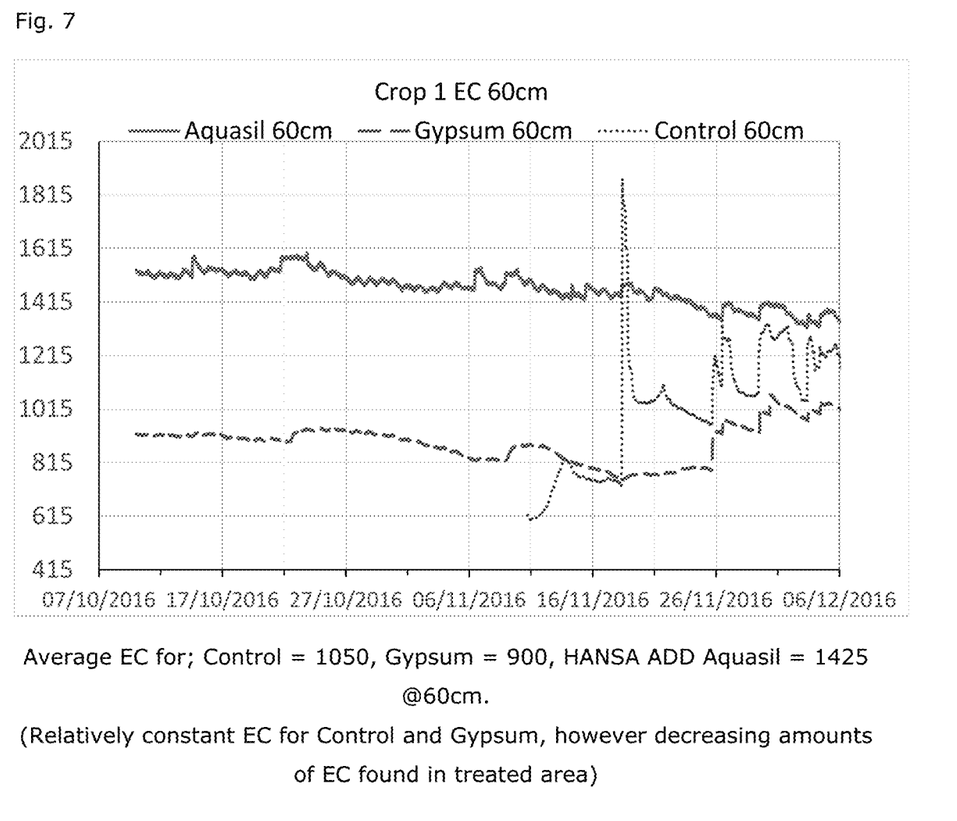
FIG. 7 shows a comparison of electrical conductivity (EC) of soil water data for treated (gypsum and inventive soil-conditioner) and untreated soil at a depth of 60 cm.

FIG. 7 shows a comparison of electrical conductivity (EC) of soil water data for treated (gypsum and inventive soil-conditioner) and untreated soil at a depth of 60 cm.

Figure 8:
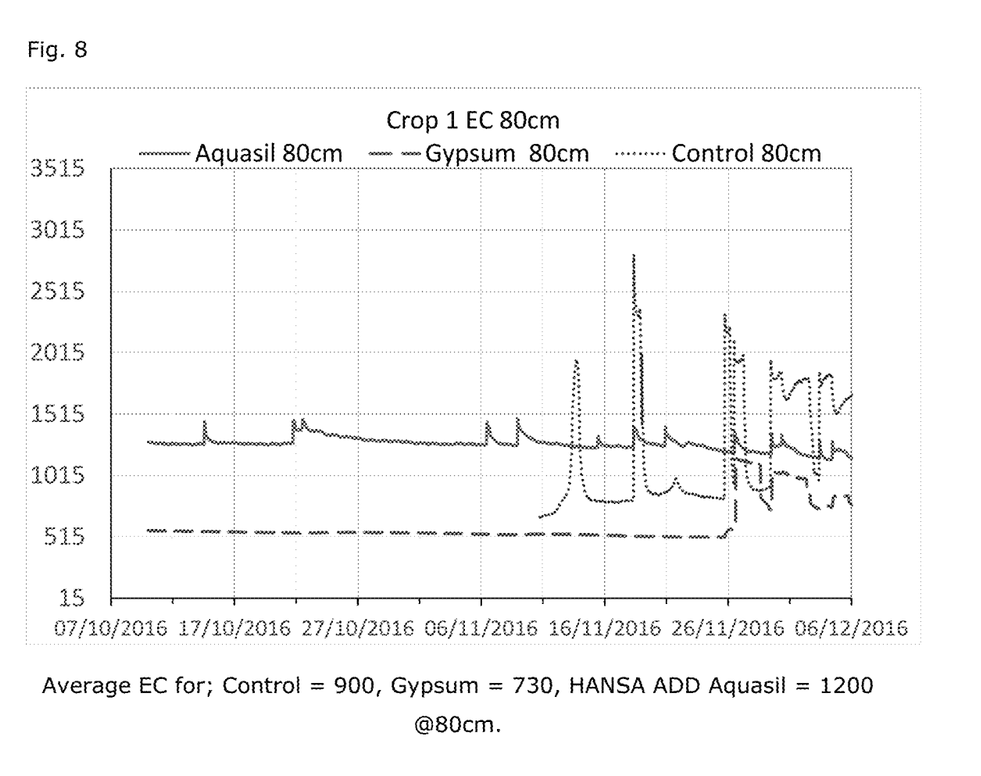
FIG. 8 shows a comparison of electrical conductivity (EC) of soil water data for treated (gypsum and inventive soil-conditioner) and untreated soil at a depth of 80 cm.

FIG. 8 shows a comparison of electrical conductivity (EC) of soil water data for treated (gypsum and inventive soil-conditioner) and untreated soil at a depth of 80 cm.

Figure 9:
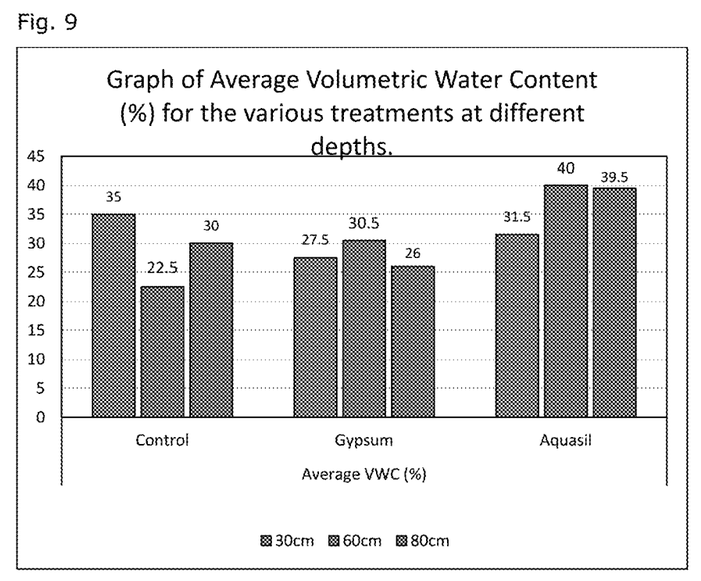
FIG. 9 shows a comparison of the average volumetric water content for various depths and treatments.

FIG. 9 shows a comparison of the average volumetric water content for various depths and treatments.

Figure 10:
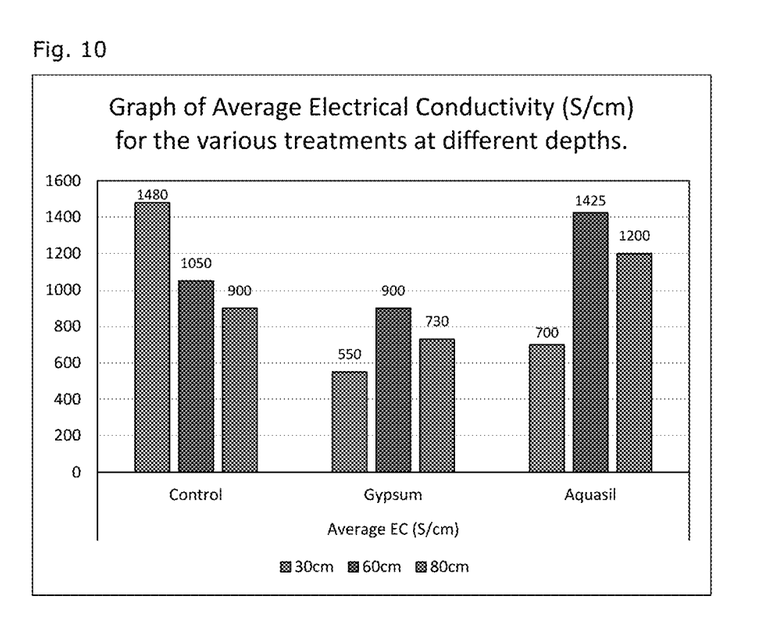
FIG. 10 shows a comparison of the average electrical conductivity for various depths and treatments.

FIG. 10 shows a comparison of the average electrical conductivity for various depths and treatments.

From a volumetric water content perspective, it was observed that at levels 60 cm and 80 cm, the treatment with the inventive soil-conditioner has increased the amount of water found in the soil by creating capillaries allowing more water to permeate to the lower levels. On the other hand, the application of gypsum has yet to reap the benefits of improving the soil structure and due to its delay in mechanism shows significantly lower levels of water content at every depth. The electrical conductivity describes the changes in salinity levels with respect to other factors such as nutrient availability, salinity, water content and soil texture. With that being said, the lower levels of conductivities indicate a limited amount of soluble salts for the control and gypsum test areas while the treatment with the inventive soil-conditioner shows a significant increase in electrical conductivity. This correlates highly with the water retention data.

EXAMPLE 2

Laboratory trials have shown that within a short time period, treatment of a sodic soil from Werribee South. Australia with the inventive soil-conditioner employed in Example 1 reduced its sodicity. The results of analyses of the soil used in a benchtop trial show that at the end of the trial, the sodium concentrations in untreated soil were substantially higher than those in soil treated with the inventive soil-conditioner. The key differences in cation concentrations found in this test are summarised below in Table 1.

TABLE 1

Key results of a benchtop trial of sodic soil treated with the inventive soil-conditioner and untreated from Werribee South, Victoria, Australia.

| Cation | Treated | Untreated | Change [%] |
|---|---|---|---|
| Calcium conc. [mol/kg] | 14 | 13 | — |
| Sodium conc. [mol/kg] | 0.64 | 1.2 | −53 |
| Sodium conc. [% of cations] | 3.4 | 6.8 | −50 |

Note that the calcium concentration did not differ appreciably between treated and untreated soil, while the concentration of sodium and its percentage of total cations was halved.

The invention claimed is:
1. A soil-conditioner comprising siloxane components comprising siloxane components having the general formula I and optionally the general formula II, wherein the general formula I is represented by wherein
n is an integer from 0 to 200,
m is an integer from 0 to 50,
o is an integer from 0 to 25
m+o is an integer from 1 to 75,
x is an integer from 1 to 12,
y is an integer from 0 to 25,
z an integer from 2 to 6
$R_1$ denotes an aliphatic radical with 1 to 3 carbon atoms or a phenyl radical,
$R_2$ denotes an aliphatic radical with 1 to 30 carbon atoms or a phenyl radical,

$R_3$ denotes hydrogen or an alkyl radical with 1 to 4 carbon atoms,
$R_4$ denotes an aliphatic radical with 10 to 18 carbon atoms
and wherein $A^-$ is an organic or inorganic anion derived from a customary physiologically tolerable acid HA,
and the general formula II is represented by wherein
m is an integer from 5 to 200,
n is an integer from 0 to 25,
k is an integer from 0 to 25,
$R_1$ denotes an aliphatic radical with 1 to 3 carbon atoms or a phenyl radical,
$R_2$ denotes an aliphatic radical with 9 to 30 carbon atoms and/or a polyether radical of the general formula $(CH_2)_3 O-(C_2H_4O)_x-(C_3H_6O)_y Q$,
wherein x and y are integers from 0 to 50 having the same or different values,
and Q is hydrogen or an alkyl radical with 1 to 4 carbon atoms,
$R_3$ denotes an epoxy radical or a radical MZ,
E denotes a radical MZ, $R_3$ or $R_2$,
wherein at least one radical MZ is present per molecule,
wherein the epoxy radical is selected from the group consisting of, wherein M is selected from the group consisting of, wherein Z is selected from the group consisting of, wherein the quaternary nitrogen atom of the group Z is bound to a carbon atom of the group M that is adjacent to the C—OH group of the same group M,
wherein $R_4$, $R_5$, $R_6$ can be the same or different and are selected from the group consisting of hydrogen, alkyl radicals with 1 to 22 carbon atoms, and/or alkylene radicals with 1 to 22 carbon atoms, wherein the alkyl and alkylene radicals may comprise hydroxyl groups,
wherein $R_8$ and $R_9$ can be the same or different and are selected from the group consisting of $R_4$, $R_5$, $R_6$ and/or alkyl radicals with 1 to 10 carbon atoms that are substituted by fluorine, chlorine or bromine,
wherein $R_{10}$ denotes —O— or —$NR_{11}$—,
wherein $R_{11}$ denotes hydrogen, an alkyl radical with 1 to 4 carbon atoms or a hydroxyalkyl radical with 1 to 4 carbon atoms,
wherein o is an integer from 1 to 4, p is an integer from 2 to 6,
and wherein $A^-$ is an organic or inorganic anion derived from a customary physiologically tolerable acid HA, characterized in that the siloxane components comprise at least one polyether modified siloxane A and at least one cationic modified siloxane B, wherein the polyether modified siloxane A and the cationic modified siloxane B can be the same or different, and wherein at least one of the siloxanes A and B corresponds to formula I.

2. The soil conditioner according to claim 1, wherein the polyether modified siloxane A corresponds to formula I, wherein m is an integer from 1 to 50.

3. The soil-conditioner according to claim 1, wherein the polyether modified siloxane A corresponds to formula II, wherein n is an integer from 1 to 25.

4. The soil-conditioner according to claim 1, wherein the cationic modified siloxane B corresponds to formula I, wherein o is an integer from 1 to 25.

5. The soil-conditioner according to claim 1, wherein cationic modified siloxane B corresponds to formula II.

6. The soil-conditioner according to claim 1, wherein the soil-conditioner comprises a solvent.

7. The soil-conditioner according to claim 1, wherein the soil-conditioner comprises an emulsion comprising 30 vol % of the siloxane components A and B, an emulsifier and water.

8. The soil-conditioner according to claim 1, wherein the soil-conditioner comprises from 0.5 to 1 vol % of the siloxane components A and B.

9. The soil-conditioner according to claim 1, wherein the polyether modified siloxane component A and the cationic modified siloxane B are different and the molar ratio of the cationic modified siloxane component B to the polyether modified siloxane component A is 0.5 or less.

10. A method for the treatment of soil, comprising, providing a soil conditioner comprising siloxane components having the general formula I or the general formula II, wherein the general formula I is represented by wherein
n is an integer from 0 to 200,
m is an integer from 0 to 50,
o is an integer from 0 to 25
m+o is an integer from 1 to 75,
x is an integer from 1 to 12,
y is an integer from 0 to 25,
z an integer from 2 to 6
$R_1$ denotes an aliphatic radical with 1 to 3 carbon atoms or a phenyl radical,
$R_2$ denotes an aliphatic radical with 1 to 30 carbon atoms or a phenyl radical,
$R_3$ denotes hydrogen or an alkyl radical with 1 to 4 carbon atoms,
$R_4$ denotes an aliphatic radical with 10 to 18 carbon atoms and wherein $A^-$ is an organic or inorganic anion derived from a customary physiologically tolerable acid HA,
and the general formula II is represented by wherein
m is an integer from 5 to 200,
n is an integer from 0 to 25,
k is an integer from 0 to 25, $R_1$ denotes an aliphatic radical with 1 to 3 carbon atoms or a phenyl radical, $R_2$ denotes an aliphatic radical with 9 to 30 carbon atoms and/or a polyether radical of the general formula $(CH_2)_3\ O\text{—}(C_2H_4O)_x\text{—}(C_3H_6O)_yQ$, wherein x and y are integers from 0 to 50 having the same or different values, and Q is hydrogen or an alkyl radical with 1 to 4 carbon atoms,

$R_3$ denotes an epoxy radical or a radical MZ,

E denotes a radical MZ, $R_3$ or $R_2$, wherein at least one radical MZ is present per molecule, wherein the epoxy radical is selected from the group consisting of, wherein M is selected from the group consisting of, wherein Z is selected from the group consisting of, wherein the quaternary nitrogen atom of the group Z is bound to a carbon atom of the group M that is adjacent to the C—OH group of the same group M, wherein $R_4$, $R_5$, $R_6$ can be the same or different and are selected from the group consisting of hydrogen, alkyl radicals with 1 to 22 carbon atoms, and/or alkylene radicals with 1 to 22 carbon atoms, wherein the alkyl and alkylene radicals may comprise hydroxyl groups, wherein $R_8$ and $R_9$ can be the same or different and are selected from the group consisting of $R_4$, $R_5$, $R_6$ and/or alkyl radicals with 1 to 10 carbon atoms that are substituted by fluorine, chlorine or bromine, wherein $R_{10}$ denotes —O— or —$NR_{11}$—, wherein $R_{11}$ denotes hydrogen, an alkyl radical with 1 to 4 carbon atoms or a hydroxyalkyl radical with 1 to 4 carbon atoms, wherein o is an integer from 1 to 4, p is an integer from 2 to 6, and wherein $A^-$ is an organic or inorganic anion derived from a customary physiologically tolerable acid HA, characterized in that the siloxane components comprise at least one polyether modified siloxane A and at least one cationic modified siloxane B, wherein the polyether modified siloxane A and the cationic modified siloxane B can be the same or different; and treating the soil with polyether modified siloxane A and/or cationic modified siloxane via a fertigation system.

11. The method for treatment of soil according to claim 10, wherein the soil is successively or simultaneously treated with both polyether modified siloxane A and cationic modified siloxane B, wherein in the case of successive treatment the polyether modified siloxane A and the cationic modified siloxane B are different.

12. The method for the treatment of soil according to claim 10, wherein the soil treated is farmland.

13. The method for treatment of soil according to claim 10, wherein the soil is treated with an amount of 20 to 180 kg per hectare of polyether modified siloxane A and/or cationic modified siloxane B.

14. The method for treatment of soil according to claim 10, wherein the soil is treated with an amount of 50 to 220 ppm of polyether modified siloxane A and/or cationic modified siloxane B.

15. The method for treatment of soil according to claim 10, wherein the soil is a sodic soil.

* * * * *